(12) United States Patent
Kim et al.

(10) Patent No.: US 10,866,661 B2
(45) Date of Patent: Dec. 15, 2020

(54) FILM TOUCH SENSOR AND METHOD FOR FABRICATING THE SAME

(71) Applicant: DONGWOO FINE-CHEM CO., LTD., Jeollabuk-do (KR)

(72) Inventors: Sang Kook Kim, Gyeonggi-do (KR); Seong Hwan Park, Gyeonggi-do (KR); Min Ju Lim, Jeollabuk-do (KR); Sung Hoon Cho, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 16/068,334

(22) PCT Filed: Jan. 6, 2017

(86) PCT No.: PCT/KR2017/000194
§ 371 (c)(1),
(2) Date: Jul. 5, 2018

(87) PCT Pub. No.: WO2017/119764
PCT Pub. Date: Jul. 13, 2017

(65) Prior Publication Data
US 2019/0018512 A1 Jan. 17, 2019

(30) Foreign Application Priority Data

Jan. 8, 2016 (KR) .................. 10-2016-0002574

(51) Int. Cl.
*G06F 3/041* (2006.01)
*C08F 220/18* (2006.01)
(Continued)

(52) U.S. Cl.
CPC .............. *G06F 3/041* (2013.01); *B32B 15/08* (2013.01); *C08F 220/18* (2013.01);
(Continued)

(58) Field of Classification Search
CPC .......... G06F 3/041; G06F 2203/04103; G06F 2203/04111; C08L 33/14; C08L 2203/16;
(Continued)

(56) References Cited

U.S. PATENT DOCUMENTS

2011/0014401 A1* 1/2011 Fujimaki ............... C08F 265/04
428/1.33
2015/0072125 A1 3/2015 Murashige et al.
(Continued)

FOREIGN PATENT DOCUMENTS

KR 10-2012-0032735 A 4/2012
KR 10-1191865 B1 10/2012
(Continued)

OTHER PUBLICATIONS

International Search Report for PCT/KR2017/000194 dated May 2, 2017.

*Primary Examiner* — Kenneth B Lee, Jr.
(74) *Attorney, Agent, or Firm* — The PL Law Group, PLLC

(57) ABSTRACT

A film touch sensor includes a separation layer; a protective layer disposed on the separation layer, and an electrode pattern layer which is disposed on the protective layer and includes an insulation layer that is a cured layer of a binder resin including (a-1) a resin in which at least a part of a phenolic hydroxyl group or a carboxyl group is protected with an acid decomposable group, (a-2) an acrylic resin containing an epoxy group, and (a-3) an acrylic resin containing an oxetane group, such that it is possible to suppress thermal damage such as wrinkles, or cracks of the insulation layer, which may occur in high-temperature deposition and annealing processes, and significantly reduce an occurrence rate of cracks during peeling-off the same from a carrier substrate.

11 Claims, 3 Drawing Sheets

(51) Int. Cl.
  *C08F 224/00*  (2006.01)
  *B32B 15/08*   (2006.01)
  *G06F 3/044*   (2006.01)
  *C08L 33/06*   (2006.01)
  *C08L 33/14*   (2006.01)
  *C08F 20/32*   (2006.01)

(52) U.S. Cl.
  CPC .......... *C08F 224/00* (2013.01); *C08L 33/066* (2013.01); *C08L 33/14* (2013.01); *G06F 3/044* (2013.01); *C08F 20/32* (2013.01); *C08F 2500/02* (2013.01); *C08L 2203/16* (2013.01); *C08L 2205/03* (2013.01); *G06F 2203/04102* (2013.01); *G06F 2203/04103* (2013.01); *G06F 2203/04111* (2013.01)

(58) Field of Classification Search
  CPC ... C08L 2205/03; C08F 20/32; C08F 2500/02
  See application file for complete search history.

(56) References Cited

U.S. PATENT DOCUMENTS

2015/0169113 A1* 6/2015 Ito .......................... G06F 3/041
                                                        345/174
2017/0285474 A1* 10/2017 Yoshida ................. G03F 7/031

FOREIGN PATENT DOCUMENTS

| KR | 10-2014-0008607 A | 1/2014 |
| KR | 10-2014-0139281 A | 12/2014 |
| KR | 10-2015-0020446 A | 2/2015 |
| TW | 201423266 A | 6/2014 |
| TW | 201443742 A | 11/2014 |

\* cited by examiner (a)

(b)

(c)

FILM TOUCH SENSOR AND METHOD FOR FABRICATING THE SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/000194, filed Jan. 6, 2017, which claims priority to the benefit of Korean Patent Application No. 10-2016-0002574 filed in the Korean Intellectual Property Office on Jan. 8, 2016, the entire contents of which are incorporated herein by reference.

BACKGROUND OF THE INVENTION

1. Field of the Invention

The present invention relates to a film touch sensor and a method for fabricating the same.

2. Description of the Related Art

Attempts are being made to introduce a touch input type into a wider variety of electronic devices due to the touch input type being in the spotlight as a next-generation input type. Accordingly, research and development for a touch sensor capable of being applied to different environments and accurately recognizing a touch have been actively executed.

For example, in a case of the electronic device having a touch input type display, an ultrathin flexible display which achieves an ultralight and a low power consumption with improved portability is in the spotlight as a next-generation display, and thus the development for a touch sensor applicable to such a display is required.

The flexible display refers to a display fabricated on a flexible substrate which is capable of being bent, folded, or warped having no reduction in operational characteristics, and techniques thereof have been developed in a form such as flexible LCDs, flexible OLEDs, electronic papers, and the like.

In order to apply the touch input type to such the flexible display, a touch sensor having excellent bendability and restoring force, as well as superior flexibility and elasticity is required.

In regard to a film touch sensor for fabricating such the flexible display, a wiring substrate including wirings buried in a transparent resin base film has been proposed.

A method for fabricating a film touch sensor includes: a wiring formation process of forming metal wirings on a carrier substrate, a lamination process of applying a transparent resin solution to the carrier substrate and drying so as to cover the metal wirings, and a peeling-off process of peeling-off the transparent resin solution from the carrier substrate.

In order to smoothly perform the peeling-off process, the above-described fabrication method uses a method in which an organic peeling-off agent such as a silicone resin or a fluorine resin; or an inorganic peeling-off agent such as a diamond-like carbon (DLC) thin film or a zirconium oxide thin film is formed on a surface of the substrate in advance. However, in a case of using the inorganic peeling-off agent in the above method, when peeling-off the base film and the metal wirings from the carrier substrate, the base film and the metal wirings are not smoothly peeled-off therefrom, such that a portion of the base film or the metal wirings is remained on the carrier substrate, and an organic material used as the peeling-off agent comes out on the surface of the base film and metal wirings.

In order to solve the above-described problems, Korean Patent Registration Publication No. 1191865 discloses a method in which, in a step of fabricating a flexible substrate of a form having metal wirings buried therein, a sacrificial layer capable of being removed by light or a solvent, metal wirings and a polymer material (flexible substrate) are formed on a carrier substrate, and the sacrificial layer is removed by using the light or solvent, and thereby the metal wirings and the polymer material (flexible substrate) are removed from the carrier substrate.

However, the above-described method has problems that, in a case of having a large size, it is difficult to remove the sacrificial layer in the removing process thereof, the metal wirings are directly exposed to a liquid such as the solvent, and various types of base film may not be used because performing a high-temperature process is impossible.

Also, there is a problem that a protective layer, an insulation layer, or the like is damaged due to a stress applied to the film touch sensor during peeling-off.

SUMMARY

Accordingly, it is an object of the present invention to provide a film touch sensor including a protective layer for covering an electrode pattern layer.

Another object of the present invention is to provide a film touch sensor capable of significantly reducing an occurrence rate of cracks during peeling-off the same from a carrier substrate.

In addition, another object of the present invention is to provide a film touch sensor capable of suppressing thermal damage such as wrinkles, or cracks of the insulation layer, which may occur in high-temperature deposition and annealing processes, due to including an insulation layer having excellent thermal resistance.

Further, another object of the present invention is to provide a method for fabricating the above film touch sensor.

The above objects of the present invention will be achieved by the following characteristics:

(1) A film touch sensor including: a separation layer; a protective layer disposed on the separation layer; and an electrode pattern layer which is disposed on the protective layer and includes an insulation layer that is a cured layer of a binder resin including (a-1) a resin in which at least a part of a phenolic hydroxyl group or a carboxyl group is protected with an acid decomposable group, (a-2) an acrylic resin containing an epoxy group, and (a-3) an acrylic resin containing an oxetane group.

(2) The film touch sensor according to the above (1), wherein the (a-3) resin includes a repeating unit represented by Formula 7 below:

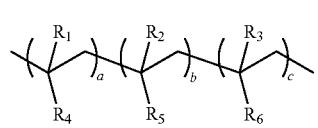

[Formula 7]

(wherein $R_1$, $R_2$ and $R_3$ are each independently hydrogen or a methyl group, and $R_4$ is a structure derived from a monomer selected from a group consisting of Formulae (1) to (3) below;

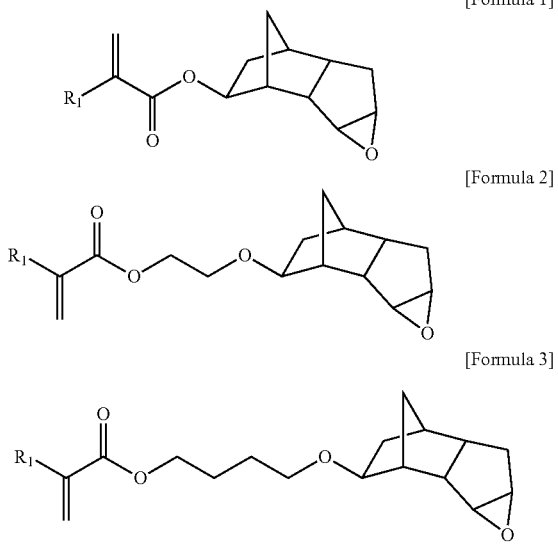

[Formula 1]

[Formula 2]

[Formula 3]

$R_5$ is a structure derived from a monomer selected from a group consisting of (meth)acrylic acid, 2-(meth)acryloyloxyethyl succinate, 2-(meth)acryloyloxyethyl hexahydrophthalate and 2-(meth)acryloyloxyethyl phthalate.

$R_6$ is a structure derived from a monomer represented by Formula (4) below;

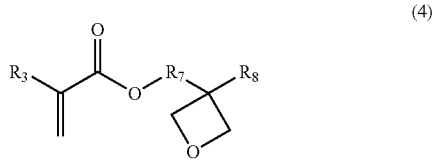

(4)

$R_7$ is an alkylene group having 1 to 6 carbon atoms,
$R_8$ is an alkyl group having 1 to 6 carbon atoms, and
a=40 to 80 mol %, b=5 to 45 mol %, and c=10 to 55 mol %).

(3) The film touch sensor according to the above (1), wherein the (a-3) resin has a weight average molecular weight of 5,000 to 30,000.

(4) The film touch sensor according to the above (1), wherein the binder resin includes 30 to 55 parts by weight of the (a-1) resin, 30 to 60 parts by weight of the (a-2) resin, and 1 to 25 parts by weight of the (a-3) resin to 100 parts by weight of the entire binder resin.

(5) The film touch sensor according to the above (1), wherein the electrode pattern layer includes: sensing electrodes including first patterns formed in a first direction and second patterns formed in a second direction; bridge electrodes configured to connect unit patterns of the second patterns with each other, which are separated from each other; and the insulation layer disposed between the sensing patterns and the bridge electrodes.

(6) The film touch sensor according to the above (1), wherein the insulation layer has an elastic modulus of 2.8 to 4.5 GPa.

(7) The film touch sensor according to the above (1), wherein the insulation layer has a transmittance of 90% or more.

(8) The film touch sensor according to the above (1), further including a base film attached to an upper side of the electrode pattern layer.

(9) A method for fabricating a film touch sensor including the steps of: forming a separation layer on a carrier substrate; forming a protective layer on the separation layer; forming an electrode pattern layer on the protective layer; and peeling-off the separation layer from the carrier substrate, wherein the step of forming the electrode pattern layer comprises applying and curing an insulation layer forming composition which contains a binder resin including (a-1) a resin in which at least a part of a phenolic hydroxyl group or a carboxyl group is protected with an acid decomposable group, (a-2) an acrylic resin containing an epoxy group, and (a-3) an acrylic resin containing an oxetane group.

(10) The method for fabricating a film touch sensor according to the above (9), wherein the curing of the insulation layer forming composition is performed including pre-bake, exposure, development and post-bake.

(11) The method for fabricating a film touch sensor according to the above (10), wherein the pre-bake is performed at 80° C. to 140° C. for 20 seconds to 1,000 seconds.

The film touch sensor of the present invention has excellent thermal resistance, such that it is possible to suppress thermal damage such as wrinkles, cracks, or the like which may occur in the high-temperature deposition and annealing processes. Thereby, it is possible to achieve an electrode pattern layer having a lower resistance due to performing the high-temperature deposition and annealing processes.

The film touch sensor of the present invention may significantly reduce an occurrence rate of cracks during peeling-off the same from a carrier substrate.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

The present invention discloses a film touch sensor including: a separation layer; a protective layer disposed on the separation layer; and an electrode pattern layer which is disposed on the protective layer and includes an insulation layer that is a cured layer of a binder resin including (a-1) a resin in which at least a part of a phenolic hydroxyl group or a carboxyl group is protected with an acid decomposable group, (a-2) an acrylic resin containing an epoxy group, and (a-3) an acrylic resin containing an oxetane group, such that it is possible to suppress thermal damage such as wrinkles, or cracks of the insulation layer, which may occur in high-temperature deposition and annealing processes, and significantly reduce an occurrence rate of cracks during peeling-off the same from a carrier substrate, and a method for fabricating the same.

Hereinafter, the present invention will be described in detail.

<Film Touch Sensor>

The film touch sensor of the present invention includes a separation layer, a protective layer and an electrode pattern layer.

In particular, embodiments of the present invention will be described in detail with reference to accompanying drawings.

Figure 1:
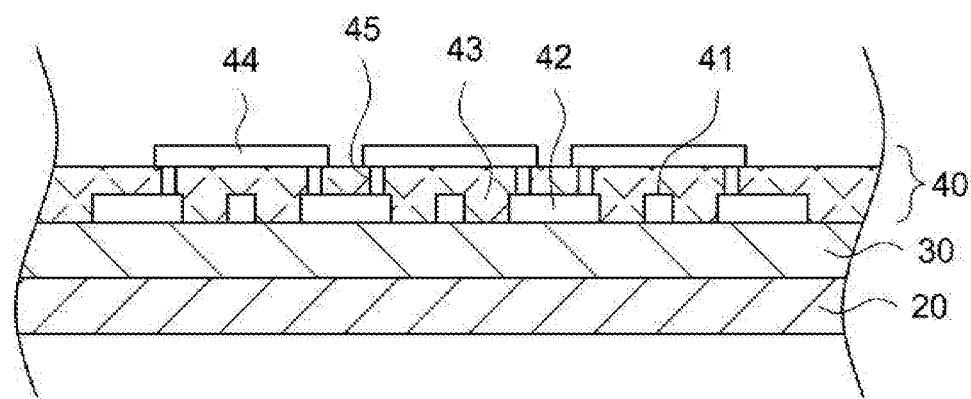
FIG. 1 is a schematic cross-sectional view illustrating a film touch sensor according to one embodiment of the present invention.
Figure 2:
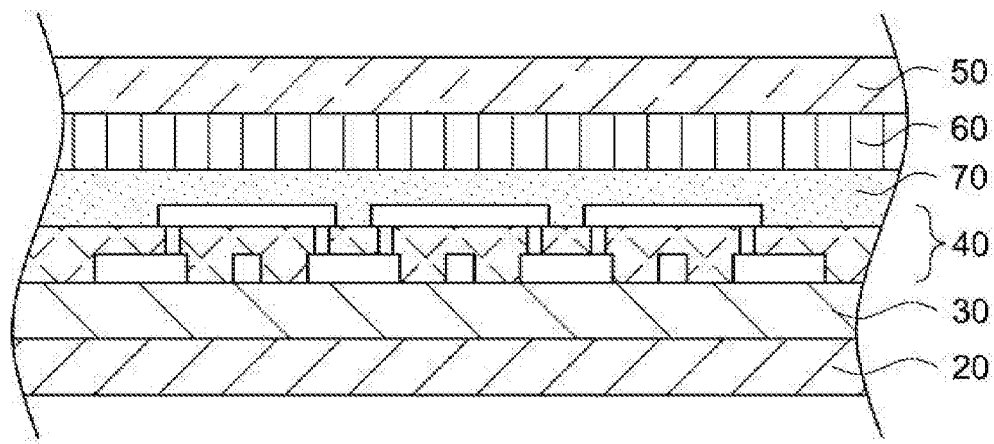
FIG. 2 is a schematic cross-sectional view illustrating the film touch sensor according to another embodiment of the present invention.

FIGS. 1 and 2 are schematic cross-sectional views illustrating the film touch sensor according to the embodiments of the present invention.

The film touch sensor of the present invention is fabricated by executing a fabrication process on a carrier substrate 10 to prepare a laminate, and separating the prepared laminate from the carrier substrate 10. A separation layer 20 is a layer formed to separate the laminate from the carrier substrate 10.

The separation layer 20 serves as a layer for covering an electrode pattern layer 40 to protect the electrode pattern layer 40 after separating from the carrier substrate 10 without being removed therefrom.

The separation layer 20 may be a polymer organic film, and may be made of, for example, a polymer such as polyimide polymer, polyvinyl alcohol polymer, polyamic acid polymer, polyamide polymer, polyethylene polymer, polystyrene polymer, polynorbonene polymer, phenyl maleimide copolymer, polyazobenzene polymer, polyphenylene phthalamide polymer, polyester polymer, polymethyl methacrylate polymer, polyarylate polymer, cinnamate polymer, coumarin polymer, phthalimidine polymer, chalcone polymer, aromatic acetylene polymer, but it is not limited thereto. These compounds may be used alone or in combination of two or more thereof.

It is preferable that the separation layer 20 is made of a material having a peel-off strength of 1 N/25 mm or less with respect to the carrier substrate 10 among the above-described materials, so as to be easily peeled-off from the carrier substrate 10, but not to be peeled-off from a protective layer 30 to be described below.

The separation layer 20 preferably has a thickness of 10 to 1000 nm, and more preferably, 50 to 500 nm. If the thickness of the separation layer 20 is less than 10 nm, uniformity of the separation layer 20 during applying is deteriorated, thereby electrode patterns are unevenly formed, tearing occurs therein due to a locally increased peel-off strength, or curling of the film touch sensor may be not controlled after separating from the carrier substrate 10. If the thickness thereof exceeds 1000 nm, the peel-off strength is not further decreased, and flexibility of the film is deteriorated.

The protective layer 30 is disposed on the separation layer 20, and, similar to the separation layer 20, covers the electrode pattern layer 40 to prevent the electrode pattern layer 40 from being polluted, and the electrode pattern layer 40 from being broken during separating from the carrier substrate 10.

Polymers known in the related art may be used for the protective layer 30 without particular limitation thereof, and the protective layer 30 may be made of, for example, an organic insulation layer without particular limitation thereof.

The protective layer 30 may be made of an inorganic material, and may be, for example, an inorganic oxide, an inorganic nitride, or the like. For example, the inorganic oxide may include silicon oxide, alumina, titanium oxide, or the like, and the inorganic nitride may include silicon nitride, titanium nitride, or the like. In an aspect of achieving high transmittance, the silicon oxide is preferably used.

The protective layer 30 made of the inorganic material may have excellent thermal resistance to reduce an occurrence of cracks due to a thermal variation and thermal stress. Thereby, it is possible to achieve the electrode pattern layer 40 having a lower resistance by performing high-temperature deposition and annealing processes. In addition, the protective layer 30 has excellent chemical resistance to suppress swelling, peeling-off, or the like of the separation layer 20.

The electrode pattern layer 40 is disposed on the protective layer 30.

The electrode pattern layer 40 includes sensing electrodes for sensing a touch, and pad electrodes.

The sensing electrodes and the pad electrodes may be located in a sensing area and a pad area on the separation layer, respectively. However, since it is necessary for the sensing electrodes and the pad electrodes to be electrically connected with each other, at least a part of the sensing electrodes may be located in the pad area, and at least a part of the pad electrodes may be located in the sensing area.

Herein, the sensing area refers to an area corresponding to a display part on which the touch is executed in the film touch sensor, and the pad area refers to an area corresponding to a pad part. That is, the sensing area on the separation layer refers to an area corresponding to the display part on the separation layer, and the pad area refers to an area corresponding to the pad part on the separation layer.

The sensing electrode and the pad electrode of the electrode pattern layer 40 may use any material without limitation thereof so long as it is a conductive material, and may be made of, for example, a material selected from metal oxides selected from a group consisting of indium tin oxide (ITO), indium zinc oxide (IZO), indium zinc tin oxide (IZTO), aluminum zinc oxide (AZO), gallium zinc oxide (GZO), fluorine tin oxide (FTC)), indium tin oxide-silver-indium tin oxide (ITO—Ag-ITO), indium zinc oxide-silver-indium zinc oxide (IZO—Ag—IZO), indium zinc tin oxide-silver-indium zinc tin oxide (IZTO—Ag-IZTO), and aluminum zinc oxide-silver-aluminum zinc oxide (AZO-Ag-AZO); metals selected from a group consisting of gold (Au), silver (Ag), copper (Cu), molybdenum (Mo), and an Ag—Pd—Cu (APC) alloy; metal nanowires selected from a group consisting of gold, silver, copper, and lead; carbon-based materials selected from a group consisting of carbon nanotube (CNT) and grapheme; and conductive polymer materials selected from a group consisting of poly (3,4-ethylenedioxythiophene) (PEDOT) and polyaniline (PANI). These compounds may be used alone or in combination of two or more thereof, and preferably, the indium tin oxide is used. Further, both of crystalline indium tin oxide and noncrystalline indium tin oxide may be used.

Unit patterns of the sensing electrode may be each independently a polygonal pattern such as a triangle, quadrangle, pentagon, hexagon, or heptagon or more.

In addition, the sensing electrode may include regular patterns. The regular pattern referrers to that a form of the patterns has regularity. For example, the unit patterns may include each independently a mesh form such as a rectangle or square, or a pattern of a form such as a hexagon.

Further, the sensing electrode may include irregular patterns. The irregular pattern referrers to that the form of the patterns has no regularity.

When the sensing electrode is made of a material such as metal nanowires, carbon-based materials, polymer materials, and the like, the sensing electrode may have a network structure.

When the sensing electrode has the network structure, since a signal is sequentially transferred to adjacent patterns in contact with each other, it is possible to attain patterns having high sensitivity.

A thickness of the sensing electrode is not particularly limited, but a thin film is preferably used as much as possible in consideration of flexibility of the film touch sensor. For example, the sensing electrode may have a thickness of 100 to 500 Å. Meanwhile, in a case of the thin film, an increase in the resistance may be problems, however, since the film touch sensor of the present invention is provided with the above-described electrode pattern layer 40 as a capping layer, it is possible to maintain excellent sensitivity by preventing an increase in the resistance.

The sensing electrodes of the electrode pattern layer 40 are formed in two directions which are different direction from each other in order to sense a touch position, and it is necessary for the electrodes arranged in each direction to be electrically insulated from each other. For this, the electrode pattern layer 40 includes an insulation layer 43, thereby the electrodes arranged in any one direction may be electrically connected with each other through bridge electrodes while maintaining an electrical insulation from the electrodes arranged in the other direction.

The insulation layer 43 according to the present invention is a cured layer of a binder resin including (a-1) a resin in which at least a part of a phenolic hydroxyl group or a carboxyl group is protected with an acid decomposable group, (a-2) an acrylic resin containing an epoxy group, and (a-3) an acrylic resin containing an oxetane group.

The binder resin according to the present invention includes three resins of (a-1) the resin in which at least a part of a phenolic hydroxyl group or a carboxyl group is protected with an acid decomposable group, (a-2) the acrylic resin containing an epoxy group, and (a-3) the acrylic resin containing an oxetane group.

By using the above-described three resins as the binder resin, it is possible to form photosensitive patterns that leave no residue due to excellent developing properties.

The elastic insulation layer 43 may have an elastic modulus of, for example, 2.8 to 4.5 GPa. If the elastic modulus thereof is less than 2.8 GPa, wrinkles may occur in the insulation layer 43 during forming the electrode. If the elastic modulus thereof exceeds 4.5 GPa, cracks may occur during peeling-off from the carrier substrate. The elastic modulus within the above range may be obtained, for example, by setting the post-bake temperature to 150° C. or higher. In an aspect of satisfying an excellent level of wrinkle suppression and peeling inhibition effects, the elastic modulus thereof is preferably 3 to 4.2 GPa.

In addition, the insulation layer 43 according to the present invention has a very high transmittance. For example, the transmittance thereof may be 90% or more, preferably 95% or more, and more preferably, 97% or more. The transmittance within the above range may be obtained, for example, by setting the post-bake temperature to 150° C. to 250° C.

In addition, since the insulation layer 43 has high heat resistance, it is possible to suppresses thermal damage such as wrinkles, cracks, and color change which may occur in the high temperature deposition and annealing processes during forming the sensing electrode of a material such as ITO, or the like. In addition, the insulation layer 43 has excellent solvent resistance to various solvents such as an etchant and a developing solution which may be exposed during forming the sensing electrode, and excellent adhesion to the sensing electrode and bridge electrode which contact with the insulation layer 43.

The (a-1) resin functions to endow solubility to the cured patterns by a photoacid generator during the exposure.

The (a-1) resin is a resin including a functional group in which at least a part of a phenolic hydroxyl group or a carboxyl group is protected with an acid decomposable group, and the functional group is not particularly limited but may include, for example, a resin polymerized by including at least one monomer represented by Formulae 1, 2, 3 and 4 below:

[Formula 1]

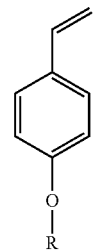

(wherein R is an alkyl group or a keto group having 1 to 6 carbon atoms, and may be substituted with an alkyl group having 1 to 6 carbon atoms, an alkoxy group having 1 to 6 carbon atoms, a cycloalkoxy group having 4 to 8 carbon atoms, or an aryl group having 6 to 16 carbon atoms.)

[Formula 2]

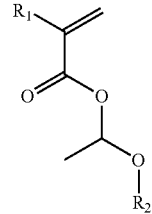

(wherein $R_1$ is hydrogen or a methyl group, and $R_2$ is an alkyl group having 1 to 6 carbon atoms or a cycloalkyl group having 4 to 8 carbon atoms.)

[Formula 3]

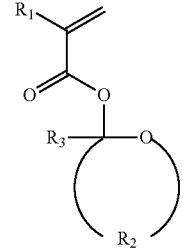

(wherein $R_1$ is hydrogen or a methyl group, $R_2$ is an alkylene group having 3 to 8 carbon atoms, and $R_3$ is an alkyl group having 1 to 6 carbon atoms or a cycloalkyl group having 4 to 8 carbon atoms.)

[Formula 4]

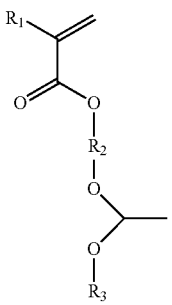

(wherein $R_1$ is hydrogen or a methyl group, $R_2$ is an alkylene group having 1 to 6 carbon atoms or a cycloalkylene group having 4 to 8 carbon atoms, and $R_3$ is an alkyl group having 1 to 6 carbon atoms or a cycloalkyl group having 4 to 8 carbon atoms.)

In the (a-1) resin, the repeating unit formed by the monomer represented by Formulae 1 to 4 may be appropriately mixed according to a specific type of other monomers that can be copolymerized as necessary, or the like, thus a content and a mixing ratio thereof are not particularly limited. For example, it is preferable that the repeating unit is included and polymerized in an amount of 20 to 60 mol %, and preferably, 30 to 60 mol % to the entire (a-1) resin, in terms of forming desired patterns.

The (a-1) resin may further include a repeating unit formed by a monomer having a phenolic hydroxyl group or a carboxyl group, which is not protected with an acid decomposable group. Examples of such a monomer may include an ethylenically unsaturated monomer having a carboxyl group.

Types of the ethylenically unsaturated monomer having a carboxyl group are not particularly limited but may include, for example, monocarboxylic acid such as acrylic acid, methacrylic acid, crotonic acid, etc.; dicarboxylic acid such as fumaric acid, mesaconic acid, itaconic acid, etc. and anhydrides thereof; mono(meth)acrylates of a polymer having carboxyl and hydroxyl groups at both ends thereof such as ω-carboxypolycaprolactone mono(meth)acrylate, etc., and preferably, acrylic acid and methacrylic acid. These compounds may be used alone or in combination of two or more thereof.

The (a-1) resin may be polymerized while further including at least one additional monomer copolymerizable with the foregoing monomer. For example, aromatic vinyl compounds such as styrene, vinyltoluene, methylstyrene, p-chlorostyrene, o-methoxystyrene, m-methoxystyrene, p-methoxystyrene, o-vinylbezylmethylether, m-vinylbenzylmethylether, p-vinylbenzylmethylether; N-substituted maleimide compounds such as N-cyclohexylmaleimide, N-benzylmaleimide, N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-m-methoxyphenylmaleimide, N-p-methoxyphenylmaleimide, etc.; alkyl (meth)acrylates such as methyl(meth)acrylate, ethyl(meth)acrylate, n-propyl(meth)acrylate, propyl(meth)acrylate, n-butyl(meth)acrylate, i-butyl(meth)acrylate, sec-butyl (meth)acrylate, t-butyl(meth)acrylate, etc.; alicyclic (meth) acrylates such as cyclopentyl(meth)acrylate, cyclohexyl (meth)acrylate, 2-methylcyclohexyl(meth)acrylate, tricyclo [5.2.1.0.2.6]decane-8-yl(meth)acrylate, 2-dicyclopentanyloxyethyl(meth)acrylate, isobornyl(meth)acrylate, etc.; aryl (meth)acrylates such as phenyl(meth)acrylate, benzyl(meth) acrylate, etc.; unsaturated oxetane compounds such as 3-(methacryloyloxymethyl)oxetane, 3-(methacryloyloxymethyl)-3-ethyloxetane, 3-(methacryloyloxymethyl)-2-trifluoromethyloxetane, 3-(methacryloyloxymethyl)-2-phenyloxetane, 2-(methacryloyloxymethyl)oxetane, 2-(methacryloyloxymethyl)-4-trifluoromethyloxetane, etc., (meth)acrylate substituted with a cycloalkane, dicycloalkane or tricycloalkane ring having 4 to 16 carbon atoms; or the like may be used. These compounds may be used alone or in combination of two or more thereof.

It is preferable that the (a-1) resin has a weight average molecular weight of 5,000 to 35,000, and preferably, 5,000 to 20,000 in terms of improving a residual film ratio and reducing the residue.

The acrylic resin (a-2) according to the present invention is a resin containing an epoxy group, and allows the resin composition to be thermally cured, such that patterns having higher durability may be formed. Thermally curing may be performed in a post-bake process, for example.

In order to introduce an epoxy group into the acrylic resin, the (a-2) according to one embodiment of the present invention may be polymerized by including a monomer represented by Formula 5 below:

[Formula 5]

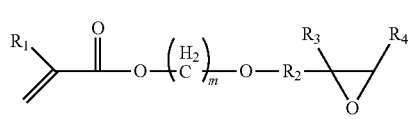

(wherein $R_1$ is hydrogen or a methyl group; $R_2$ is an alkylene group having 1 to 6 carbon atoms; $R_3$ and $R_4$ are each independently hydrogen or an alkyl group having 1 to 6 carbon atoms, or are linked with each other to form a ring having 3 to 8 carbon atoms; and m is an integer of 1 to 6).

The monomer represented by Formula 5 includes an oxygen atom adjacent to $R_2$. When a chain includes the oxygen atom, a radius of rotation of a single bond is increased to reduce a glass transition temperature, and thereby improving flowability and facilitating processing.

Further, in Formula 5, a length of the monomer may be controlled through adjustment of the m, and a gradient of the pattern formed therethrough may be adjusted. In this case, by decreasing the gradient of the pattern, it is possible to prevent a delamination of the cured film or an occurrence of cracks during deposing a transparent electrode.

In addition, as one embodiment of the present invention, the (a-2) resin according to the present invention may be polymerized by including a monomer represented by Formula 6 below, such that an epoxy group may be introduced therein:

[Formula 6]

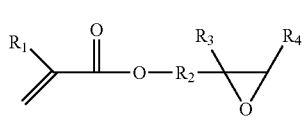

(wherein $R_1$ is hydrogen or a methyl group; $R_2$ is an alkylene group having 1 to 6 carbon atoms; $R_3$ and $R_4$ are each independently hydrogen or an alkyl group having 1 to 6 carbon atoms, or are linked with each other to form a ring having 3 to 8 carbon atoms).

The monomer represented by Formula 6 has an advantage of improving transmittance in the resin to be polymerized.

In the (a-2) resin, the repeating unit containing an epoxy group, for example, the repeating unit formed by the monomer represented by Formula 5 or 6 may be appropriately mixed according to a specific type of other monomers that can be copolymerized as necessary, or the like, thus a content and a mixing ratio thereof are not particularly limited. For example, it is preferable that the repeating unit is included and polymerized in an amount of 5 to 60 mol % to the entire (a-2) resin, in terms of improving transparency and easiness in processing, and maximizing effects of preventing an occurrence of cracks in the cured film during deposing the transparent electrode by adjusting the gradient of the pattern.

The (a-2) resin may be polymerized by using monomers known in the related art that can form an acrylic resin, other than the monomers represented by Formula 5 or 6. As a specific example, the monomers exemplified as the monomers that can be copolymerized in the (a-1) resin may be used.

It is preferable that the (a-2) acrylic resin containing an epoxy group has a weight average molecular weight of 5,000 to 40,000, and preferably, 15,000 to 30,000 in terms of improving developing properties and reducing the residue.

The (a-3) acrylic resin containing an oxetane group according to the present invention functions to improve developing properties and aging stability.

The (a-3) acrylic resin containing an oxetane group according to the present invention may include a repeating unit represented by Formula 7 below:

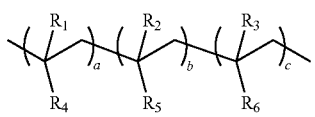

[Formula 7]

(wherein $R_1$, $R_2$ and $R_3$ are each independently hydrogen or a methyl group, and $R_4$ is a structure derived from a monomer selected from a group consisting of Formulae 1 to 3 below:

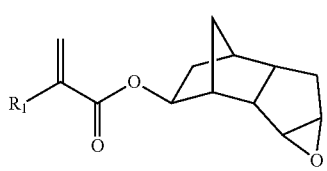

[Formula 1]

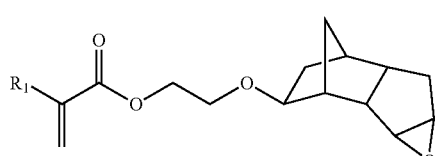

[Formula 2]

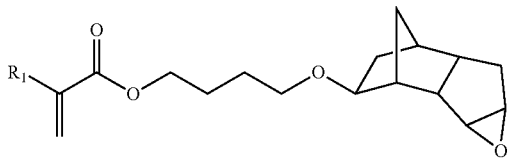

[Formula 3]

(wherein $R_5$ is a structure derived from a monomer selected from a group consisting of (meth)acrylic acid, 2-(meth)acryloyloxyethyl succinate, 2-(meth)acryloyloxyethyl hexahydrophthalate, 2-(meth)acryloyloxyethyl phthalate, and 2-(meth)acryloyloxyethyl succinate, $R_6$ is a structure derived from a monomer represented by Formula (4) below,

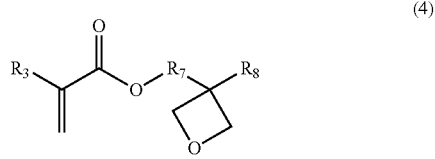

(4)

$R_7$ is an alkylene group having 1 to 6 carbon atoms,
$R_8$ is an alkyl group having 1 to 6 carbon atoms, and
a=40 to 80 mol %, b=5 to 45 mol %, and c=10 to 55 mol %).

It is preferable that the (a-3) acrylic resin containing an oxetane group has a weight average molecular weight of 5,000 to 30,000, and preferably, 8,000 to 20,000 in terms of reducing the residue and improving aging stability due to the enhanced developing properties.

When mixing the binder resin according to the present invention with the above-described three resins, the developing properties may be significantly increased without decreasing patterning ability, and thereby reducing the residue.

In the binder resin according to the present invention, a mixing ratio of the three resins is not particularly limited, but it is preferable that the (a-1), (a-2) and (a-3) resins are included in a mixing weight ratio of 30 to 55 parts by weight ('wt. parts') of the (a-1) resin, 30 to 60 wt. parts of the (a-2) resin, and 1 to 25 wt. parts of the (a-3) resin to 100 wt. parts of the entire binder resin, in terms of improving the residual film ratio and aging stability.

A thickness of the insulation layer 43 is not particularly limited, and is commonly in a range of 0.1 to 100 μm, preferably 0.5 to 50 μm, and more preferably 0.5 to 30 μm.

The sensing electrode may include a first pattern 41 formed in a first direction, a second pattern 42 formed by separating unit patterns thereof in a second direction, and bridge patterns 44 connecting the separated unit patterns of the second pattern.

The insulation layer 43 may be located only at an intersect portion of the bridge pattern 44 and the first pattern 41 in an island form, and may be located at a layer including the intersect portion of the bridge pattern 44 and the first pattern 41 in a layer form. When the insulation layer 43 is located in the layer form, the bridge pattern 44 may be connected to the second pattern 42 through a contact hole 45 formed in the insulation layer 43.

A lamination sequence of the patterns is not particularly limited, and the first pattern 41 and the second pattern 42, the insulation layer 43, and the bridge pattern 44 may be laminated in this order. Alternatively, the bridge pattern 44, the insulation layer 43, and the first pattern 41 and the second pattern 42 are laminated in this order.

The film touch sensor of the present invention may further include a base film 50 attached to an upper side of the electrode pattern layer 40.

The base film 50 may use a transparent film made of any material widely used in the related art without particular limitation thereof. For example, the base film may be made of any one selected from a group consisting of cellulose ester (for example: cellulose triacetate, cellulose propionate, cellulose butyrate, cellulose acetate propionate and nitrocellulose), polyimide, polycarbonate, and polyester (for example: polyethylene terephthalate, polyethylene naphthalate, poly-1,4-cyclohexane dimethyl terephthalate, polyethylene 1,2-diphenoxyethane-4,4'-dicarboxylate and polybutylene terephthalate), polystyrene (for example: syndiotactic polystyrene), polyolefin (for example: polypropylene, polyethylene and polymethylpentene), polysulfone, polyethersulfone, polyarylate, polyether-imide, polymethyl methacrylate, polyether ketone, polyvinyl alcohol and polyvinyl chloride, which may be used alone or as a mixture thereof.

Further, the transparent film may be an isotropic film or a retardation film.

When the transparent film is the isotropic film, an in-plane retardation (Ro, Ro=[nx−ny]×d], nx and ny represent a main refractive index of a film plane (in-plan refractive index), nz represents a refractive index in a thickness direction of the film, and d represents a thickness of the film) is 40 nm or less, and preferably, 15 nm or less, and a retardation in a thickness direction (Rth, Rth=[(nx+ny)/2−nz]×d) ranges from −90 nm to +75 nm, preferably, −80 nm to +60 nm, and more preferably, −70 nm to +45 nm.

The retardation film is a film fabricated by processes including mono-axial stretching or biaxial stretching of a polymer film, polymer coating, and liquid crystal coating, and is generally used to enhance and control optical characteristics such as compensation for a viewing angle, enhancement of color sensitivity, enhancement of light leakage, control of a color taste in a display.

Further, as the base film 50, a polarizing plate may also be used.

The polarizing plate may be a type in which a polarizer protective film is attached to one surface or both surfaces of a polyvinyl alcohol polarizer.

Further, as the base film 50, a protective film may also be used.

The protective film may be a film in which an adhesive layer is formed on at least one surface of a film made of a polymer resin or a film having self-adhesion such as polypropylene, and may be used to protect a surface of the film touch sensor and enhance workability.

Preferably, the base film 50 has light transmittance of 85% or more, and preferably 90% or more. Further, the base film 50 preferably has a total Haze value of 10% or less, and preferably, 7% or less, which is measured by JIS K7136.

A thickness of the base film 50 is not limited, but is preferably, 30 to 150 μm, and more preferably, 70 to 120 μm.

The base film 50 may be attached through a pressure-sensitive adhesive layer 60.

The pressure-sensitive adhesive layer 60 refers to an adhesive layer or bonding layer.

As an adhesive or bonding agent, any conventional adhesive or bonding agent known in the related art may be used without particular limitation thereof. For example, thermo-setting or photo-curable adhesive or bonding agent such as polyester, polyether, urethane, epoxy, silicone, acrylic adhesive may be used.

The film touch sensor of the present invention may further include a passivation layer 70 between the electrode pattern layer 40 and the base film 50.

The passivation layer 70 serves to prevent the electrode pattern layer 40 from being contaminated by exposing to an external environment (water, air, etc.).

The passivation layer 70 may be formed in a desired pattern using metal oxide such as silicon oxide, a transparent insulation layer forming composition containing an acrylic resin, a thermosetting resin composition, or the like.

The passivation layer 70 may have an appropriate thickness, for example, 2,000 nm or less. Thus, for example, the thickness thereof may be 0 to 2,000 nm.

<Image Display Device>

In addition, the present invention has an object to provide an image display device including the above-described film touch sensor.

The film touch sensor of the present invention may be applicable to typical liquid crystal display devices, in addition, other different image display devices such as an electro-luminescent display device, plasma display device, electro-luminescent emission display device, or the like.

Further, the film touch sensor of the present invention has excellent bending properties, such that the display image device may be a flexible image display device.

<Method for Fabricating a Film Touch Sensor>

Furthermore, the present invention provides a method for fabricating a film touch sensor.

Figure 3:
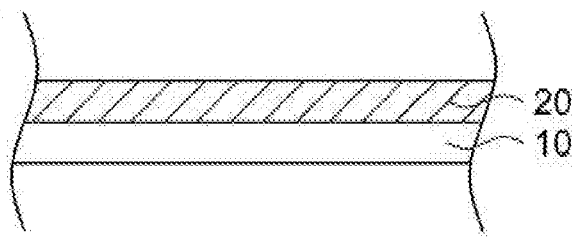
FIG. 3 is a schematic view illustrating processes of a method for fabricating the film touch sensor according to one embodiment of the present invention.
Figure 3:
Figure 3:
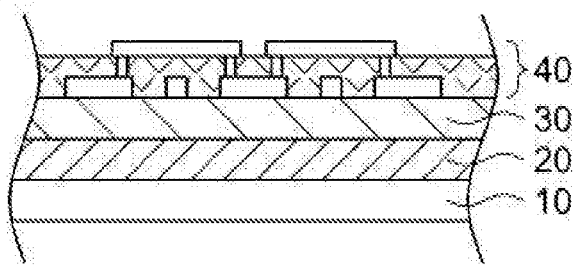
Figure 3:
Figure 3:
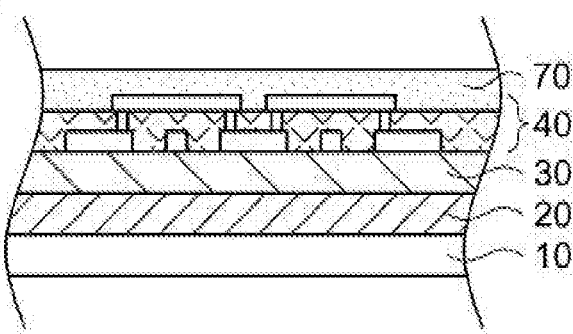
Figure 3:
Figure 4:
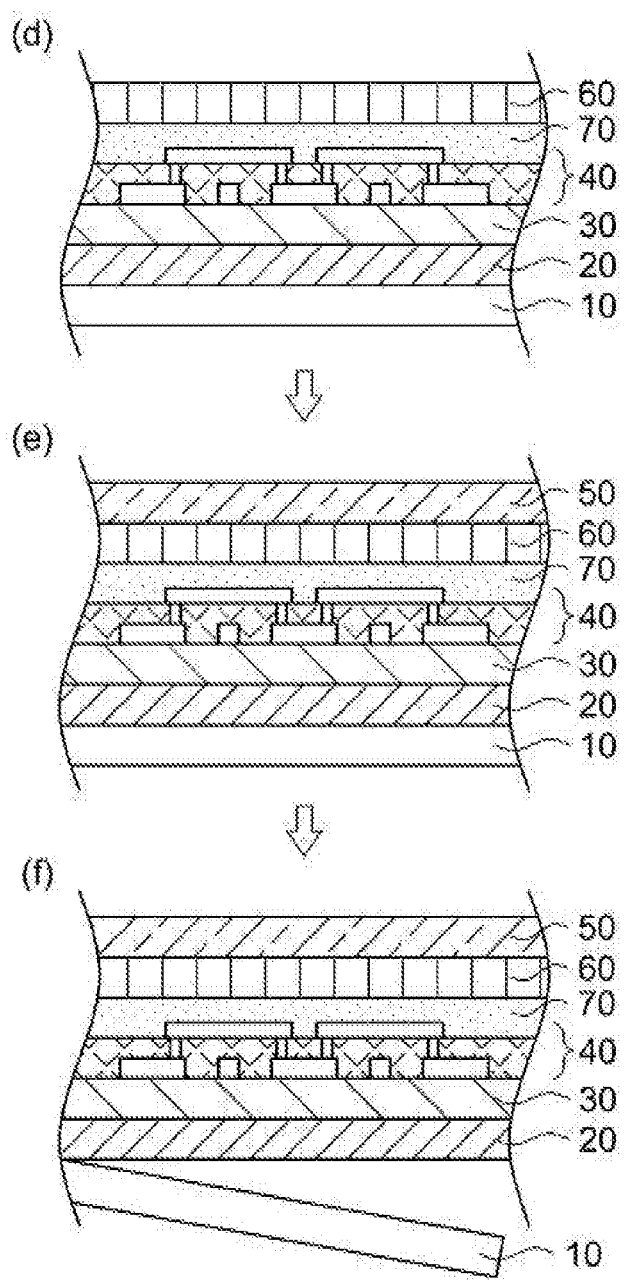
FIG. 4 is a schematic view illustrating processes of a method for fabricating the film touch sensor according to another embodiment of the present invention.

FIGS. 3 and 4 are schematic views illustrating processes of the method for fabricating a film touch sensor according to one embodiment of the present invention, which illustrate one embodiment when including steps of forming a passivation layer and attaching a base film to be described below, but the present invention is not limited thereto.

Hereinafter, the method for fabricating a film touch sensor of the present invention will be described in detail with reference to accompanying FIGS. 3 and 4.

First, as illustrated in (a) of FIG. 3, a separation layer 20 is formed on a carrier substrate 10.

The carrier substrate 10 may be made of any material without particular limitation thereof so long as it provides a proper strength with little effect on heat and chemical treatments, so that the substrate is not easily bent or distorted during processing but may be fixed. For example, glass, quartz, silicon wafer, SUS, etc. may be used, and glass is preferably used.

The separation layer 20 may be made of the above-described polymer material.

When the electrode pattern layer 40 is made of metal materials, peeling-off from the carrier substrate 10 may be difficult. But, since the separation layer 20 may be easily peeled-off form the carrier substrate 10, during forming the separation layer 20, it is possible to reduce a problem such as a damage in the electrode pattern layer 40 due to a decreased impact applied to the touch sensor during peeling-off from the carrier substrate 10.

In an aspect of minimizing a physical damage applied during peeling-off, preferably, the separation layer 20 has a peel-off strength of 1 N/25 mm or less with respect to the carrier substrate 10.

A method of forming the separation layer 20 is not particularly limited but may include any conventional method known in the related art, for example, slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like.

After forming the separation layer 20 by the above-described process, the inventive method may further perform an additional curing process.

A method for curing the separation layer 20 is not particularly limited but may include photo-curing, thermosetting or both of these processes. In a case of executing both of the photo-curing and the thermosetting processes, the sequence thereof is not particularly limited.

Next, as illustrated in (b) of FIG. 3, a protective layer 30 is formed on the separation layer 20.

The protective layer 30 may be made of the above-described material, and a method for forming the same is not particularly limited but may include any conventional method known in the related art such as physical deposition, chemical deposition, plasma deposition, plasma polymerization, thermal deposition, thermal oxidation, amphoteric oxidation, cluster-ion beam deposition, screen printing, gravure printing, flexo printing, offset printing, ink-jet coating, dispenser printing, and the like.

Then, as illustrated in (c) of FIG. 3, an electrode pattern layer 40 is formed on the protective layer 30.

The step of forming the electrode pattern layer 40 includes applying an insulation layer forming composition which contains a binder resin including (a-1) a resin in which at least a part of a phenolic hydroxyl group or a carboxyl group is protected with an acid decomposable group, (a-2) an acrylic resin containing an epoxy group, and (a-3) an acrylic resin containing an oxetane group.

The binder resin may use the above-described binder resin.

A content of the binder resin according to the present invention is not particularly limited so long as it can fully express functions thereof but may be included, for example, in an amount of 5 to 50% by weight ('wt. %'), and preferably, 10 to 40 wt. % to a total weight of the composition. When the content of the binder resin is included within the above-described range, there is an advantage that effects of improving sensitivity and degradation ability while having a proper viscosity may be maximized.

The insulation layer forming composition according to the present invention may further include a photoacid generator and a solvent.

The photoacid generator is a compound for generating acid by irradiating with an actinic ray or radiation.

Types of the photoacid generator are not particularly limited but may include, for example, diazonium salt, phosphonium salt, sulfonium salt, iodonium salt, imidesulfonate, oxime sulfonate, diazodisulfone, disulfone, ortho-nitrobenzylsulfonate, triazine compounds. These compounds may be used alone or in combination of two or more thereof.

A content of the photoacid generator is not particularly limited so long as it can fully express functions thereof but may be included, for example, in an amount of 0.1 to 20 wt. parts, and preferably, 0.5 to 10 wt. parts to 100 wt. parts of the binder resin. When the content of the photoacid generator is included within the above-described range, there is an advantage that a chemical change due to the catalytic action of the acid may sufficiently occur, and uniform application may be achieved during applying the resin composition.

In the present invention, the resin composition may further include a sensitizer together with the photoacid generator, as necessary.

The sensitizer is a component that facilitates degradation of the photoacid generator to improve sensitivity. The sensitizer according to the present invention is not particularly limited but may include, for example, polynuclear aromatic compounds, xanthenes, xanthones, cyanines, oxonols, thiazines, acridines, acridones, anthraquinones, squaliums, styryls, base styryls, coumarins, anthracene compounds. These compounds may be used alone or in combination of two or more thereof.

Preferably, the sensitizer according to the present invention is a compound represented by Formula 8 below:

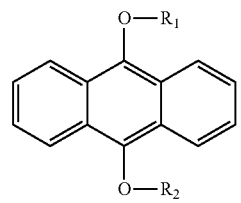

[Formula 8]

(wherein $R_1$ and $R_2$ are each independently an alkyl group having 1 to 6 carbon atoms Preferably, the sensitizer represented by Formula 8 is compounds represented by Formulae 9 to 11 below.

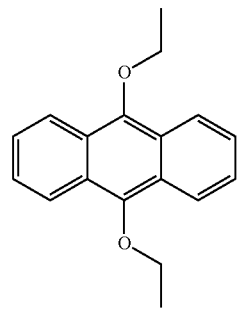

[Formula 9]

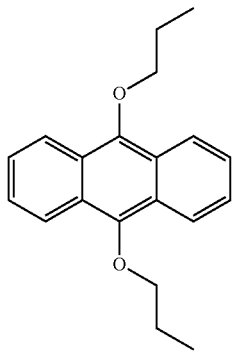

[Formula 10]

[Formula 11]

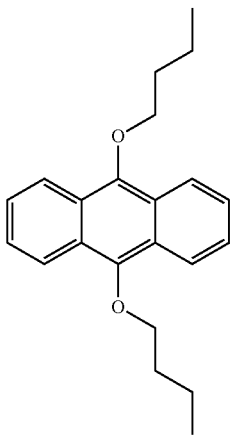

A content of the sensitizer according to the present invention is not particularly limited so long as it can fully express functions thereof but may be included, for example, in an amount of 0.01 to 60 wt. parts, and preferably, 0.5 to 10 wt. parts to 100 wt. parts of the binder resin. When the content of the sensitizer is included within the above-described range, there is an advantage that effects of improving sensitivity and transmittance due to spectral sensitization may be maximized.

Types of the solvent are not particularly limited but may use any solvent so long as it can dissolve the above-described components, and form a uniform and smooth coating film after the evaporation of the solvent, while having an appropriate drying rate.

Particular examples of the solvent may include ethers, acetates, esters, ketones, amides, lactones, etc., which may be used alone or in combination of two or more thereof.

Particular examples of the ethers may include ethyleneglycol monoalkylethers such as ethyleneglycol monomethylether, ethyleneglycol monoethylether, ethyleneglycol monopropylether, ethyleneglycol monobutylether, etc.; ethyleneglycol dialkylethers such as ethyleneglycol dimethylether, ethyleneglycol diethylether, ethyleneglycol dipropylether, etc.; propyleneglycol monoalkylethers such as propyleneglycol monomethylether, propyleneglycol monoethylether, propyleneglycol monopropylether, propyleneglycol monobutylether, etc.; propyleneglycol dialkylethers such as propyleneglycol dimethylether, propyleneglycol diethylether, diethyleneglycol monomethylether, diethyleneglycol monoethylether, etc.; diethyleneglycol dialkylethers such as diethyleneglycol dimethylether, diethyleneglycol diethylether, diethyleneglycol ethylmethylether, etc.; dipropyleneglycol monoalkylethers such as dipropyleneglycol monomethylether, dipropyleneglycol monoethylether, dipropyleneglycol monopropylether, dipropyleneglycol monobutylether, etc., dipropyleneglycol dialkylethers such as dipropyleneglycol dimethylether, dipropyleneglycol diethylether, dipropyleneglycol ethylmethylether, or the like.

Particular examples of the acetates may include ethyleneglycol monoalkylether acetates such as ethyleneglycol monomethylether acetate, ethyleneglycol monoethylether acetate, ethyleneglycol monopropylether acetate, ethyleneglycol monobutylether acetate, etc.; propyleneglycol monoalkylether acetates such as propyleneglycol monomethylether acetate, propyleneglycol monoethylether acetate, propyleneglycol monopropylether acetate, propyleneglycol monobutylether acetate, etc.; diethyleneglycol monoalkylether acetates such as diethyleneglycol monomethylether acetate, diethyleneglycol monoethylether acetate, diethyleneglycol monopropylether acetate, diethyleneglycol monobutylether acetate, etc.; dipropyleneglycol monoalkylether acetates such as dipropyleneglycol monomethylether acetate, dipropyleneglycol monoethylether acetate, dipropyleneglycol monopropylether acetate, dipropyleneglycol monobutylether acetate, etc.; propyleneglycol dialkyl acetates such as propyleneglycol methylethyl acetate, or the like.

Particular examples of the esters may include methyl lactate, ethyl lactate, n-propyl lactate, isopropyl lactate, n-butyl lactate, isobutyl lactate, n-amyl lactate, isoamyl lactate, n-butyl acetate, isobutyl acetate, n-amyl acetate, isoamyl acetate, n-hexyl acetate, 2-ethylhexyl acetate, ethyl propionate, n-propyl propionate, isopropyl propionate, n-butyl propionate, isobutyl propionate, methyl butyrate, ethyl butyrate, n-propyl butyrate, isopropyl butyrate, n-butyl butyrate, ethyl hydroxyacetate, ethyl 2-hydroxy-2-methyl propionate, ethyl 2-hydroxy-3-methyl butyrate, ethyl methoxyacetate, ethyl ethoxyacetate, methyl 3-methoxypropionate, ethyl 3-methoxypropionate, methyl 3-ethoxypropionate, ethyl 3-ethoxypropionate, 3-methoxybutyl acetate, 3-methyl-3-methoxybutyl acetate, 3-methyl-3-methoxybutyl propionate, 3-methyl-3-methoxybutyl butyrate, methyl acetoacetate, ethyl acetoacetate, methyl pyruvate, ethyl pyruvate, diethyleneglycol methylethyl ester, or the like.

Particular examples of the ketones may include methylethyl ketone, methylpropyl ketone, methyl-n-butyl ketone, methylisobutyl ketone, 2-heptanone, 3-heptanone, 4-heptanone, or the like.

Particular examples of the amides may include N-methylformamide, N,N-dimethylformamide, N-methylacetamide, N,N-dimethylacetamide, N-methylpyrrolidone, or the like.

Particular examples of the lactones may include γ-butyrolactone.

It is preferable that propyleneglycol methylether acetate, diethyleneglycol methylethyl ester, or a mixture thereof is used, in terms of applicability and uniformity in a film thickness of the insulation layer.

A content of the solvent is not particularly limited so long as it can fully express functions thereof but may be included, for example, in an amount of 40 to 90 wt. %, and preferably, 50 to 80 wt. % to a total weight of the composition. When the content of the solvent is included within a range of 40 wt. % or more but less than or equal to 90 wt. %, there is an advantage of increasing coating properties since the content and viscosity of a solid thereof may be maintained in an appropriate level.

Meanwhile, in addition to the solvent, the insulation layer forming composition according to the present invention may further include additives such as an alkaline compound, a surfactant, an adhesion enhancer, a thermal crosslinking agent, a photo-stabilizer, a photo-curing promoter, an antihalation agent (leveling agent), and a defoaming agent, which are generally used in the related art, within a scope without departing from the objects of the present invention.

Types of the alkaline compound are not particular limited, and any one of compounds used as a chemically amplified resist may be selected and used. Particular examples thereof may include aliphatic amines, aromatic amines, heterocyclic amines, quaternary ammonium hydroxides, quaternary ammonium salts of carboxylic acid, or the like. These compounds may be used alone or in combination of two or more thereof.

Particular examples of the aliphatic amines may include trimethylamine, diethylamine, triethylamine, di-n-propylamine, tri-n-propylamine, di-n-pentylamine, tri-n-pentylamine, diethanolamine, triethanolamine, dicyclohexylamine, dicyclohexylmethylamine, or the like.

Particular examples of the aromatic amines may include aniline, benzylamine, N,N-dimethylaniline, diphenylamine, or the like.

Particular examples of the heterocyclic amines may include pyridine, 2-methylpyridine, 4-methylpyridine, 2-ethylpyridine, 4-ethylpyridine, 2-phenylpyridine, 4-phenylpyridine, N-methyl-4-phenylpyridine, 4-dimethylaminopyridine, imidazole, benzimidazole, 4-methylimidazole, 2-phenylbenzimidazole, 2,4,5-triphenylimidazole, nicotine, nicotinic acid, nicotinic acid amide, quinoline, 8-oxyquinoline, pyrazine, pyrazole, pyridazine, purine, pyrrolidine, piperidine, 1,5-diazabicyclo[4.3.0]-5-nonene, 1,8-diazabicyclo[5.3.0]-7-undecene, or the like.

Particular examples of the quaternary ammonium hydroxides may include tetramethylammonium hydroxide, tetraethylammonium hydroxide, tetra-n-butylammonium hydroxide, tetra-n-hexylammonium hydroxide, or the like.

Particular examples of the quaternary ammonium salts of carboxylic acid may include tetramethylammonium acetate, tetramethylammonium benzoate, tetra-n-butylammonium acetate, tetra-n-butylammonium benzoate, or the like.

The content of the alkaline compound is not particularly limited within a range capable of performing functions thereof. For example, the alkaline compound may be included in an amount of 0.001 to 1 wt. part, and preferably, 0.005 to 0.5 wt. parts to 100 wt. parts of the binder resin. When the content of the alkaline compound is included within a range of 0.001 wt. parts or more but less than or equal to 1 wt. part to 100 wt. parts of the binder resin, there is an advantage that an interlayer insulation layer having favorable heat resistance and solvent resistance may be formed.

The surfactant is a component that improves adhesion of the insulation layer forming composition.

Types of the surfactant is not particularly limited, and various surfactants such as a fluorine-containing surfactant, nonionic surfactant, cationic surfactant, anionic surfactant and silicone surfactant may be used. These surfactants may be used alone or in combination of two or more thereof.

Particular examples of the fluorine-containing surfactant may include MAGAFAC F171, F172, F173, F176, F177, F141, F142, F143, F144, R30, F437, F475, F479, F482, F554, F780 and F781 (tradename, products of DIC Co.,), FLUORAD FC430, FC431 and FC171 (tradename, products of Sumitomo 3M Co., Ltd.), SURFLON S-382, SC-101, SC-103, SC-104, SC-105, SC1068, SC-381, SC-383, 5393 and KH-40 (tradename, products of Asahi Glass Co., Ltd.), SOLSPERSE 20000 (tradename, products of Lubrizol Japan Co., Ltd.)

Particular examples of the nonionic surfactant may include glycerol, trimethylolpropane, trimethylolethane, and ethoxylated or propoxylated compounds thereof (for example, propoxylated glycerol or ethoxylated glycerine), etc.; polyoxyethylene lauryl ether such as PLURONIC L10, L31, L61, L62, 10R5, 17R2 and 25R2 and TETRONIC 304, 701, 704, 901, 904 and 150R1 (tradename, products of BASF), polyoxyethylene stearyl ether, polyoxyethylene oleyl ether, polyoxyethylene octylphenyl ether, polyoxyethylene nonylphenyl ether, polyethyleneglycol dilaurate, polyethyleneglycol distearate, sorbitan fatty acid ester, or the like.

Particular examples of the cationic surfactant may include phthalocyanine-modified compounds such as EFKA-745 (tradename, product of Morishita & Co., Ltd.), organosiloxane polymers such as KP341 (tradename, product of Shin-Etsu Chemical Co., Ltd.); (Meth) acrylic acid (co) polymer such as POLYFLOW No. 75, No. 90 and No. 95 (tradename, products of Kyoeisha Chemical Co., Ltd.), W001 (tradename, product of Yusho Co., Ltd.), or the like.

Particular examples of the anionic surfactant may include W004, W005 and W017 (tradename, products of Yusho Co., Ltd.)

Particular examples of the silicone surfactant may include TORAY SILICONE DC3PA, SH7PA, DC11PA, SH21PA, SH28PA, SH29PA, SH30PA and SH8400 (trade name, products of Dow Corning Toray Co., Ltd.), TSF-4440, 4300, 4445, 4460 and 4452 (tradename, products of Momentive Performance Materials Inc.), KP341, KF6001 and KF6002 (tradename, products of Shin-Etsu Chemical Co., Ltd.), BYK307, 323 and 330 (tradename, products of BYK Chemie Co.), or the like The content of the surfactant is not particularly limited within a range capable of performing functions thereof. For example, the surfactant may be included in an amount of 0.01 to 5 wt. parts, and preferably, 0.05 to 3 wt. parts to 100 wt. parts of the binder resin. When the content of the surfactant is included within a range of 0.01 wt. parts or more but less than or equal to 5 wt. parts to 100 wt. parts of the binder resin, there is an advantage that effects of improving adhesion may be maximized.

The adhesion enhancer may improve adhesion with silicon compounds such as silicon, silicon oxide, silicon nitride, etc., and metal such as gold, copper, aluminum, etc., and may be useful for adjusting a taper angle.

Types of the adhesion enhancer are not particularly limited, and particular examples thereof may include a silane coupling agent or a thiol compound, and preferably, the silane coupling agent.

Types of the silane coupling agent are not particularly limited, and particular examples thereof may include γ-aminopropyl trimethoxysilane, γ-aminopropyl triethoxysilane, γ-glycidoxypropyl trialkoxysilane, γ-glycidoxypropylalkyl dialkoxysilane, γ-methacryloxypropyl trialkoxysilane, γ-methacryloxypropylalkyl dialkoxysilane, γ-chloropropyl trialkoxysilane, γ-mercaptopropyl trialkoxysilane, β-(3,4-epoxycyclohexyl)ethyl trialkoxysilane, vinyl trialkoxysilane, or the like, preferably, γ-glycidoxypropyl trialkoxysilane or γ-methacryloxypropyl trialkoxysilane, and more preferably, γ-glycidoxypropyl trialkoxysilane. These compounds may be used alone or in combination of two or more thereof.

The content of the adhesion enhancer is not particularly limited within a range capable of performing functions thereof. For example, the adhesion enhancer may be included in an amount of 0.1 to 20 wt. parts to 100 wt. parts of the binder resin, and preferably, 0.5 to 10 wt. parts. When the content of the adhesion enhancer is included within a range of 0.1 wt. parts or more but less than or equal to 20 wt. parts to 100 wt. parts of the binder resin, there is an advantage that effects of improving adhesion with insulation layer and adjusting the taper angle may be maximized.

The thermal crosslinking agent is a component used as a composition, which allows a crosslinking reaction to smoothly occur through UV irradiation and heat treatment when forming the insulation layer, and thereby improving the heat resistance.

Types of the thermal crosslinking agent are not particularly limited, and particular examples thereof may include a polyacrylate resin, epoxy resin, phenol resin, melamine resin, organic acid, amine compounds, anhydride compounds, or the like. These resins and compounds may be used alone or in combination of two or more thereof.

The content of the thermal crosslinking agent is not particularly limited within a range capable of performing functions thereof. For example, the thermal crosslinking agent may be included in an amount of 0.01 to 5 wt. parts, and preferably, 0.1 to 3 wt. parts to 100 wt. parts of the binder resin. When the content of the thermal crosslinking agent is included within a range of 0.01 wt. parts or more but less than or equal to 5 wt. parts to 100 wt. parts of the binder resin, there is an advantage that effects of improving the heat resistance may be maximized.

The photo-stabilizer is a component that improves light resistance of the insulation layer forming composition.

Types of the photo-stabilizer are not particularly limited, and particular examples thereof may include benzotriazole, triazine, benzophenone, hindered aminoether, and hindered amine compounds, etc. These compounds may be used alone or in combination of two or more thereof.

The content of the photo-stabilizer is not particularly limited within a range capable of performing functions thereof. For example, the photo-stabilizer may be included in an amount of 0.01 to 5 wt. parts, and preferably, 0.1 to 3 wt. parts to 100 wt. parts of the binder resin. When the content of the photo-stabilizer is included within a range of 0.01 wt. parts or more but less than or equal to 5 wt. parts to 100 wt. parts of the binder resin, there is an advantage that effects of improving the light resistance may be maximized.

An application method of the insulation layer forming composition is not particularly limited, and may include, for example, a coating method using slit nozzles such as a spray coating, a roll coating, or a discharge coating method using nozzles, etc., a rotation applying method such as a center drop spinning, an extrusion coating, or a bar coating method, etc., which may be used in combination of two or more thereof during coating.

A thickness of the applied film depends on the application method, a concentration of the solid content in the composition, the viscosity thereof, and the like, but usually may be applied so that the film has a thickness of 0.5 to 100 μm after drying.

The curing of the applied composition may include, for example, a pre-bake step, a step of selectively exposing and developing the insulation layer forming composition to form a pattern, and a post-bake step.

The pre-bake is a process of volatilizing a solvent by applying vacuum, infrared rays or heat, in order to obtain a coated film without fluidity after forming the coated film.

Heating conditions depend on the type or mixing of each component, but may be performed at a temperature of 80 to 140° C. for 20 to 1,000 seconds, preferably, 90 to 130° C. for 60 to 300 seconds, and more preferably, 100 to 120° C. for 60 to 180 seconds. When the heating conditions of the pre-bake are within the above-described range, it is possible to implement a gentle pattern angle (about 30° to 45°) and excellent sensitivity (for example, 40 mJ or less).

Next, the selective exposure process may be performed by irradiating excimer laser beam, far ultraviolet rays, ultraviolet rays, visible light, electron beams, X-ray, g-beam (wavelength: 436 nm), i-beam (wavelength: 365 nm), and h-beam (wavelength: 405 nm), or mixed beams thereof. The exposure may be performed by contact, proximity, projection exposure methods, and the like.

In the present invention, after performing development using the alkaline developer, the insulation layer forming composition is subjected to the post-bake (high-temperature calcination) step. The thermal crosslinking agent, and the like are applied to the insulation layer forming composition for the high-temperature calcination as a component.

The post-bake step may be performed using a heating apparatus such as a hot plate or an oven under a temperature of 150 to 350° C. for 30 minutes to 3 hours, preferably, 180° C. to 250° C. for 20 minutes to 50 minutes, and more preferably, 180 to 210° C. for 20 minutes to 40 minutes. After completing the heat treatment, fully cross-linked and cured patterns may be obtained. When the heating conditions of the pre-bake are within the above-described range, it is possible to implement an insulation layer having an optimal level of elastic modulus and high transmittance.

If necessary, the curing of the photosensitive resin composition may be performed by further including mid-bake before the post-bake. In such a case, adjustment of the pattern angle and sensitivity may be more easily executed.

The mid-bake may be performed at 110 to 180° C. for 5 minutes to 30 minutes, and preferably, 130 to 150° C. for 5 minutes to 10 minutes. When the performing conditions of the mid-bake are within the above-described range, adjustment of the pattern angle and effects of improving the sensitivity may be maximized.

More specifically, the step of forming the electrode pattern layer 40 further includes a step of forming a sensing electrode.

The formation sequence thereof is not particularly limited, and the first electrode 41 and the second electrode 42, the insulation layer 43 and the bridge electrode 44 may be formed in this order. Alternately, the bridge electrode 44, the insulation layer 43, and the first electrode 41 and the second electrode 42 are formed in this order.

The sensing electrode may be formed according to the same method as the method of forming the protective layer 30 with the above-described material.

In an aspect of ensuring that the electrode pattern layer 40 has a low resistance, preferably, the electrode pattern layer 40 is formed through a high-temperature process of 150° C. to 250° C. Specifically, the electrode pattern layer 40 may be formed, for example, by a deposition process at 150° C. to 250° C., or may be formed at room temperature deposition, and a heat treatment process at 150° C. to 250° C., but it is not limited thereto.

Next, as illustrated in (f) of FIG. 4, the separation layer 20 is peeled-off from the carrier substrate 10.

A laminate in which the separation layer 20, the protective layer 30, the electrode pattern layer 40 and the insulation layer 43 are laminated on the carrier substrate 10 in this order may be obtained through the above-described processes. Then, the separation layer 20 is peeled-off from the carrier substrate 10, such that the laminate may be used as the film touch sensor.

The method for fabricating a film touch sensor of the present invention may further include a step of attaching the base film 50 on the electrode pattern layer 40 as illustrated in (d) and (e) of FIG. 4. Specifically, the inventive method may further include a step of forming a pressure-sensitive adhesive layer 60 on the electrode pattern layer 40, and a step of attaching the base film 50 on the pressure-sensitive adhesive layer 60.

In this case, the peeling-off process may be performed before or after the attachment of the base film 50. FIG. 4 illustrates a case in which the peeling-off process is performed after the base film 50 is attached.

The pressure-sensitive adhesive layer 60 may be made of the above-described adhesive or bonding agent, and may be formed by applying the adhesive or bonding agent to the electrode pattern layer 40 by using the method such as slit coating, knife coating, spin coating, casting, micro gravure coating, gravure coating, bar coating, roll coating, wire-bar coating, dip coating, spray coating, screen printing, gravure printing, flexo printing, offset printing, ink-jet coating, dispenser printing, nozzle coating, capillary coating, or the like, and then drying and curing the same.

It is preferable that the pressure-sensitive adhesive layer 60 has the elastic modulus and peel-off strength within above-described ranges in an aspect of suppressing an occurrence of cracks in the film touch sensor during the peeling-off process.

In addition, the inventive method may further include a step of forming a passivation layer 70 on the electrode pattern layer 40 as illustrated in (c) of FIG. 3.

The passivation layer 70 may be formed according to the same method as the method of forming the protective layer 30 with the above-described material.

As described above, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples and Comparative Examples (1) Insulation Layer Forming Composition

The components listed in Table 1 below were mixed in the indicated amounts (wt. parts) to prepare an insulation layer forming composition.

TABLE 1

| Item | Binder resin (A) Type | Binder resin (A) wt. parts | Photoacid generator (B)/ Photosensitizer (C) wt. parts | Solvent (D) Type | Solvent (D) wt. parts | Alkaline compound (E) wt. parts | Coupling agent (F) wt. parts | Surfactant (G) Type | Surfactant (G) wt. parts |
|---|---|---|---|---|---|---|---|---|---|
| Example 1 | A1-1/A2-1/A2-3/A3-1 | 50/25/20/5 | 1.0/0.5 | D1/D2 | 120/80 | 0.01 | 1.0 | G1/G2 | 0.1/0.1 |
| Example 2 | A1-1/A2-1/A2-3/A3-1 | 50/25/15/15 | 1.0/0.5 | D1/D2 | 120/80 | 0.01 | 1.0 | G1/G2 | 0.1/0.1 |
| Example 3 | A1-1/A2-1/A2-3/A3-2 | 50/25/20/5 | 1.0/0.5 | D1/D2 | 120/80 | 0.01 | 1.0 | G1/G2 | 0.1/0.1 |
| Example 4 | A1-1/A2-1/A2-3/A3-3 | 50/25/20/5 | 1.0/0.5 | D1/D2 | 120/80 | 0.01 | 1.0 | G1/G2 | 0.1/0.1 |
| Example 5 | A1-2/A2-1/A2-3/A3-1 | 50/25/20/5 | 1.0/0.5 | D1/D2 | 120/80 | 0.01 | 1.0 | G1/G2 | 0.1/0.1 |
| Example 6 | A1-2/A2-2/A2-4/A3-1 | 50/25/15/15 | 1.0/0.5 | D1/D2 | 120/80 | 0.01 | 1.0 | G1/G2 | 0.1/0.1 |
| Example 7 | A1-2/A2-1/A2-3/A3-2 | 50/25/20/5 | 1.0/0.5 | D1/D2 | 120/80 | 0.01 | 1.0 | G1/G2 | 0.1/0.1 |
| Example 8 | A1-2/A2-1/A2-3/A3-3 | 50/25/20/5 | 1.0/0.5 | D1/D2 | 120/80 | 0.01 | 1.0 | G1/G2 | 0.1/0.1 |
| Example 9 | A1-3/A2-1/A2-3/A3-1 | 40/25/20/15 | 1.0/0.5 | D1/D2 | 120/80 | 0.01 | 1.0 | G1/G2 | 0.1/0.1 |
| Example 10 | A1-3/A2-2/A2-4/A3-1 | 40/25/20/15 | 1.0/0.5 | D1/D2 | 120/80 | 0.01 | 1.0 | G1/G2 | 0.1/0.1 |
| Example 11 | A1-3/A2-1/A2-3-1/A3-2 | 40/25/20/15 | 1.0/0.5 | D1/D2 | 120/80 | 0.01 | 1.0 | G1/G2 | 0.1/0.1 |
| Example 12 | A1-3/A2-1/A2-3/A3-3 | 40/25/20/15 | 1.0/0.5 | D1/D2 | 120/80 | 0.01 | 1.0 | G1/G2 | 0.1/0.1 |
| Example 13 | A1-4/A2-1/A2-3/A3-1 | 45/25/20/10 | 1.0/0.5 | D1/D2 | 120/80 | 0.01 | 1.0 | G1/G2 | 0.1/0.1 |
| Example 14 | A1-4/A2-2/A2-4/A3-1 | 45/25/20/10 | 1.0/0.5 | D1/D2 | 120/80 | 0.01 | 1.0 | G1/G2 | 0.1/0.1 |
| Example 15 | A1-4/A2-1/A2-3/A3-2 | 45/25/20/10 | 1.0/0.5 | D1/D2 | 120/80 | 0.01 | 1.0 | G1/G2 | 0.1/0.1 |
| Example 16 | A1-4/A2-1/A2-3/A3-3 | 45/25/20/10 | 1.0/0.5 | D1/D2 | 120/80 | 0.01 | 1.0 | G1/G2 | 0.1/0.1 |
| Example 17 | A1-1/A2-1/A2-3/A3-1 | 50/25/20/5 | 1.0/0.5 | D1/D2 | 120/80 | 0.01 | 1.0 | G1/G2 | 0.1/0.1 |
| Example 18 | A1-1/A2-1/A2-3/A3-1 | 50/25/15/15 | 1.0/0.5 | D1/D2 | 120/80 | 0.01 | 1.0 | G1/G2 | 0.1/0.1 |
| Example 19 | A1-1/A2-1/A2-3/A3-2 | 50/25/20/5 | 1.0/0.5 | D1/D2 | 120/80 | 0.01 | 1.0 | G1/G2 | 0.1/0.1 |
| Comparative Example 1 | A1-1/A2-1/A2-3 | 50/15/35 | 1.0/0.5 | D1/D2 | 120/80 | 0.01 | 1.0 | G1/G2 | 0.1/0.1 |
| Comparative Example 2 | A1-1/A2-2/A2-4 | 50/15/35 | 1.0/0.5 | D1/D2 | 120/80 | 0.01 | 1.0 | G1/G2 | 0.1/0.1 |
| Comparative Example 3 | A1-2/A2-1/A2-3 | 50/25/25 | 1.0/0.5 | D1/D2 | 120/80 | 0.01 | 1.0 | G1/G2 | 0.1/0.1 |
| Comparative Example 4 | A1-3/A2-1/A2-3 | 50/25/25 | 1.0/0.5 | D1/D2 | 120/80 | 0.01 | 1.0 | G1/G2 | 0.1/0.1 |

TABLE 1-continued

| Item | Binder resin (A) Type | wt. parts | Photoacid generator (B)/ Photosensitizer (C) wt. parts | Solvent (D) Type | wt. parts | Alkaline compound (E) wt. parts | Coupling agent (F) wt. parts | Surfactant (G) Type | wt. parts |
|---|---|---|---|---|---|---|---|---|---|
| Comparative Example 5 | A1-4/A2-1/ A2-3 | 50/25/25 | 1.0/0.5 | D1/D2 | 120/80 | 0.01 | 1.0 | G1/G2 | 0.1/0.1 |
| Comparative Example 6 | A1-2/A2-2/ A2-4 | 50/15/35 | 1.0/0.5 | D1/D2 | 120/80 | 0.01 | 1.0 | G1/G2 | 0.1/0.1 |

1. Binder resin (a, b and c are a molar ratio)

A1-1:

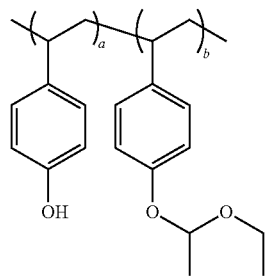

a/b=60/40, Mw=12,000

A1-2:

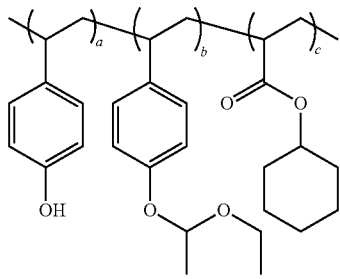

a/b/c=60/25/15, Mw=12,000

A1-3:

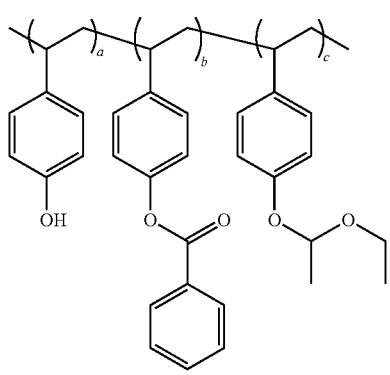

a/b/c=55/15/30, Mw=11,000

A1-4:

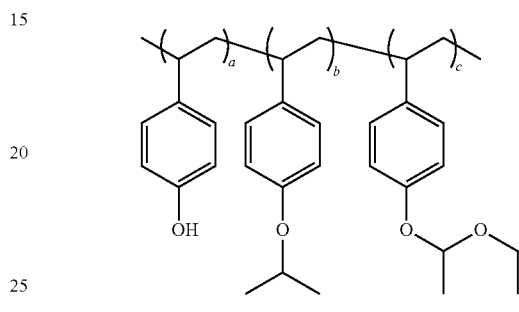

a/b/c=55/15/30, Mw=11,000

A2-1, A2-2:

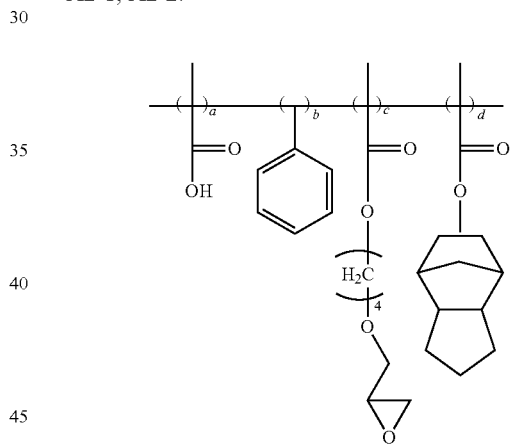

A2-1: a/b/c/d=15/10/50/25 Mw=25,000
A2-2: a/b/c/d=20/15/30/35, Mw=25,000
A2-3, A2-4:

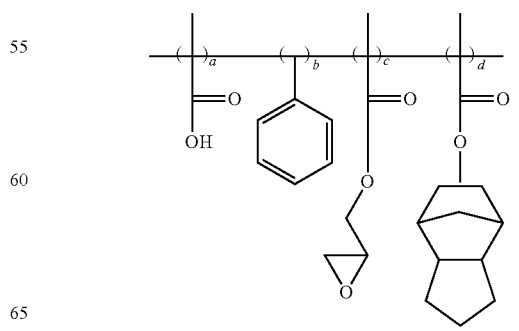

A2-3: a/b/c/d=15/10/50/25, Mw=25,000
A2-4: a/b/c/d=20/15/30/35, Mw=25,000
A3:

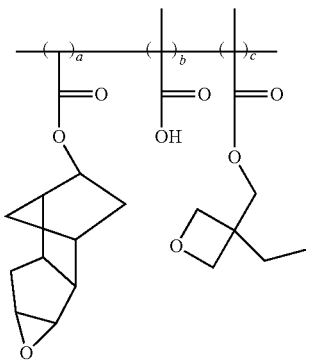 [SMILES: CCC1(COC(=O)C(C)(C)C(C)(C(=O)O)C(C)C(=O)OC2CC3C4C5OC5CC4C34CC24)COC1]

A3-1: a/b/c=60/20/20, Mw=9000
A3-2: a/b/c=60/10/30, Mw=9000
A3-3: a/b/c=50/20/30, Mw=9000

2. Photoacid generator:

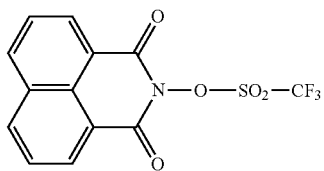

3. Photo-sensitizer:

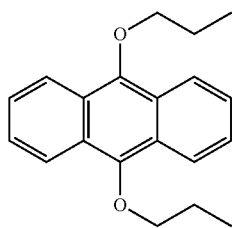 [SMILES: CCCOc1c2ccccc2c(OCCC)c2ccccc12]

4. Solvent
D1: propyleneglycol methylethyl acetate
D2: diethyleneglycol methylethyl ester
5. Alkaline compound: dicyclohexylmethylamine
6. Silane coupling agent: γ-glycidoxypropyl trialkoxysilane
7. Surfactant: G1: SH-8400 (Dow Corning Co.), G2: F-475 (DIC Co.)

(2) Film Touch Sensor

A soda lime glass having a thickness of 700 μm was used as a carrier substrate, and a composition for forming a separation layer, which is prepared by diluting 50 wt. parts of melamine resin and 50 wt. parts of cinnamate resin in propyleneglycol monomethylether acetate (PGMEA) in a concentration of 10 wt. %, was applied to the carrier substrate at a thickness of 300 nm by a coater, and dried at 150° C. for 30 minutes to form a separation layer.

Then, a composition for forming a protective layer (prepared by admixing 40 wt. parts of poly-functional acryl monomer and 60 wt. parts of epoxy resin, and adding the mixture in a solvent in which 30 wt. parts of diethyleneglycol methylethylether (MEDG), 40 wt. parts of PGMEA, and 30 wt. parts of 3-methoxybutanol were admixed together so as to have a ratio of 20 wt. parts in terms of solid content) was applied to the separation layer at a thickness of 2 μm by a coater, irradiated with UV rays having an intensity of 200 mJ/cm$^2$ to execute photo-curing thereon, and dried and cured at 200° C. for 30 minutes to form a protective layer.

ITO was deposited on the protective layer to a thickness of 35 nm at room temperature of 25° C., and the ITO layer was annealed at 230° C. for 30 minutes to form first and second patterns.

An insulation layer was formed on the first and second patterns using the compositions of the examples and comparative examples. The composition was applied at a thickness of 2 μm with a spin coater and pre-baked at 110° C. for 2 minutes in a convection oven. Thereafter, the layer was exposed to 40 mj/cm$^2$ (based on i-beam) with a proximity aligner and developed with a TMAH 2.38% developing solution. After the development, the layer was subjected to bleaching exposure at 300 mJ/cm$^2$ based on electric lines (g, h and i-beams).

Thereafter, post-bake was performed at 200° C. for 30 minutes by a convection oven to form an insulation layer.

However, in Examples 17, 18 and 19, the pre-bake temperature was set to be 140° C., 150° C. and 255° C., respectively.

A bridge pattern was formed on the insulation layer with silver, copper, and a palladium alloy, and was connected to the second pattern through a contact hole formed in the insulation layer.

Then, a passivation layer was formed on the electrode pattern layer with a silicon insulation material ($SiO_2$).

Thereafter, an adhesive composition, which includes 50 wt. parts of CEL2021P ((3,4-epoxycyclohenaxane)methyl 3,4-epoxy cyclohexylcarboxylate containing SP500 as a polymerization initiator and KRM230 as a leveling agent, 20 wt. parts of neopentyl glycol diglycidylether (NPGDGE), 10 wt. parts of 1,6-hexanediol diacrylate, 5 wt. parts of trimethylolpropane triacrylate, 10 wt. parts of KRM0273 as an adhesion promoter, and 5 wt. parts of 4-HBVE as a diluted monomer, was applied on the passivation layer between a TAC film having a thickness of 60 μm and the insulation layer by a spuit, and pressed by a roll laminator to form an adhesive layer so as to have a thickness of 2 μm. The adhesive layer was irradiated with UV rays having an intensity of 10 mW/cm$^2$ for 100 seconds to closely contact with each other, dried in an oven at 80° C. for 10 minutes, and then left at room temperature.

Experimental Example

1. Measurement of Sensitivity

Photosensitive resin compositions of the examples and comparative examples were applied to a glass substrate having a thickness of 0.7 mm (Corning 1737, manufactured by Corning Co.) with a spinner, and heated on a hot plate at 100° C. for 125 seconds to volatilize the solvent, thereby forming a photosensitive resin composition layer having a thickness of 4.0 μm.

Thereafter, in order to obtain a contact hole pattern having a diameter of 10 μm, exposure was performed with an i-beam stepper (NSR-205i11D, Nikon Co.) using a mask having a rectangular pattern opening whose exposed portion has sides of 10 μm.

The substrate after the exposure was subjected to a puddle development at 23° C. for 40 seconds using a 2.38% tetramethyl ammonium hydroxide aqueous solution as a developing solution, and then heated in an oven at 230° C. for 30 minutes to obtain a cured film.

Subsequently, the substrate was cut vertically, and an exposure amount used to form the 10 μm contact hole in each composition was selected as the sensitivity.

2. Measurement of Transmittance

Transmittance of the film obtained from Experimental Example 1 at 400 nm was measured by a spectrophotometer. Measured results are shown in Table 2 below.

3. Measurement of Pattern Angle

The pattern obtained from Experimental Example 1 was vertically cut, and an angle with the substrate was calculated from an optical scanning electron microscope (SEM) photograph. Measured results are shown in Table 2 below.

4. Assessment of Adhesion of Bridge Pattern

Sputtering of an Ag—Pd—Cu (APC) alloy or ITO was performed on the film obtained from Experimental Example 1 at a thickness of 2500 Å and 1350 Å, respectively, to form a bridge pattern, and 100 cells were drawn in a lattice having a size of 1 cm×1 cm on the bridge pattern using a method of ASTM D3359. Then, evaluation of pattern picking was carried out repeatedly three times using an adhesion evaluation tape (3M Co., 610) according to the following standards. Evaluated results are shown in Table 2 below.

5B: no pattern picking observed at the cut corner portion of the coated film, and no peeling-off observed in the lattice of the coated film.

4B: slight pattern picking was observed at the corner portion, and peeling-off was occurred in the lattice within a range of 5% or less to the entire lattice.

3B: pattern picking and crumbling were observed at the corner portion, and peeling-off was occurred in the lattice within a range of 15% or less to the entire lattice.

2B: pattern picking and crumbling were also observed in the lattice, and peeling-off was occurred in the lattice within a range of exceeding 15% but less than 35% to the entire lattice.

1B: pattern picking of a large ribbon form was observed, and peeling-off was occurred in the lattice within a range of exceeding 35% but less than 65% to the entire lattice.

0B: peeling-off was occurred in the lattice within a range of exceeding 65% to the entire lattice to cause a defective adhesion.

5. Measurement of Elastic Modulus

As an independent process from the film touch sensor prepared in the examples and comparative examples, only an insulation layer was formed on a soda lime glass having a thickness of 700 μm by the same manner as the examples and comparative examples. The elastic modulus was measured according to the method of KS M ISO 6721-4. Measured results are shown in Table 2 below.

6. Evaluation of Whether Cracking Occurs after Peeling-Off

A 3M #55 tape (having a width of 25 mm and a length of 10 cm) was stuck on the film touch sensors prepared in the examples and comparative examples, respectively, and then cut around the tape (width of 25 mm) with a cutter. The end of the tape was held and the film touch sensor was peeled-off from the carrier substrate to visually observe whether a crack occurs in the coated film transferred to the tape according to the following standards, and observed results are shown in Table 2 below.

◯: state of no crack x: state of occurring cracks

7. Evaluation of Thermal Stability

As an independent process from the film touch sensor prepared in the examples and comparative examples, only an insulation layer was formed on a soda lime glass having a thickness of 700 μm as a carrier substrate by the same manner as the examples and comparative examples. Thereafter, the glass was further heated at 230° C. for 20 minutes to measure a change in transmittance according to the following standards, and measured results are shown in Table 2 below.

◯: 3ΔT % or less

Δ: 4 to 8ΔT % x: 9ΔT % or more

8. Evaluation of Solvent Resistance

As an independent process from the film touch sensor prepared in the examples and comparative examples, only an insulation layer was formed on a soda lime glass having a thickness of 700 μm as a carrier substrate by the same manner as the examples and comparative examples. Thereafter, the glass was immersed in propyleneglycol monomethylether acetate and heated at 100° C. for 30 minutes, then a change in a thickness of the film before and after the heating was measured according to the following standards, and measured results are shown in Table 2 below.

◯: exceeding 98%

Δ: 95% to 98% x: less than 95%

9. Assessment of ITO Resistance

As an independent process from the film touch sensor prepared in the examples and comparative examples, only an insulation layer was formed on a soda lime glass having a thickness of 700 μm as a carrier substrate by the same manner as the examples and comparative examples. Thereafter, ITO sputtering was performed on the insulation layer so as to have a thickness of 1,000 Å, then a change in a film wrinkle state was measured according to the following standards, and measured results are shown in Table 2 below.

◯: state of no wrinkle x: state of occurring wrinkle

10. Assessment of Etching Resistance

As an independent process from the film touch sensor prepared in the examples and comparative examples, only an insulation layer was formed on a soda lime glass having a thickness of 700 μm as a carrier substrate by the same manner as the examples and comparative examples. Subsequently, the glass was immersed in an ITO etchant (MA-SO2, manufactured by Dongwoo Fine-Chem. Co.) at 60° C. for 10 minutes, then a change in a film thickness before and after the immersion was measured and expressed as a percentage, and measured results are shown in Table 2 below.

◯: exceeding 98%

Δ: 95% to 98% x: less than 95%

TABLE 2

| Item | Transmittance (T %) | Sensitivity (mj) | Pattern angle (°) | Adhesion of bridge pattern APC | Adhesion of bridge pattern ITO | Elastic modulus (GPa) | Delamination Crack | Thermal stability (T %) | Solvent resistance | ITO resistance | Etching resistance |
|---|---|---|---|---|---|---|---|---|---|---|---|
| Example 1 | 96 | 40 | 35 | 5B | 5B | 4.5 | ○ | 0.4 | ○ | ○ | ○ |
| Example 2 | 96 | 30 | 36 | 5B | 5B | 4.5 | ○ | 0.7 | ○ | ○ | ○ |
| Example 3 | 97 | 35 | 35 | 5B | 5B | 4.2 | ○ | 1.2 | ○ | ○ | ○ |
| Example 4 | 96 | 40 | 38 | 5B | 5B | 4.5 | ○ | 1.5 | ○ | ○ | ○ |
| Example 5 | 96 | 40 | 35 | 5B | 5B | 4.5 | ○ | 2.2 | ○ | ○ | ○ |
| Example 6 | 96 | 30 | 40 | 5B | 5B | 4.4 | ○ | 1.8 | ○ | ○ | ○ |
| Example 7 | 97 | 30 | 42 | 5B | 5B | 4.2 | ○ | 2.5 | ○ | ○ | ○ |
| Example 8 | 97 | 35 | 45 | 5B | 5B | 4.2 | ○ | 2.8 | ○ | ○ | ○ |
| Example 9 | 96 | 40 | 45 | 5B | 5B | 4.2 | ○ | 2.2 | ○ | ○ | ○ |
| Example 10 | 95 | 35 | 43 | 5B | 5B | 4.2 | ○ | 2.8 | ○ | ○ | ○ |
| Example 11 | 95 | 40 | 40 | 5B | 5B | 4.2 | ○ | 1.5 | ○ | ○ | ○ |
| Example 12 | 96 | 40 | 35 | 5B | 5B | 4.2 | ○ | 1.8 | ○ | ○ | ○ |
| Example 13 | 95 | 40 | 40 | 5B | 5B | 4.2 | ○ | 1.9 | ○ | ○ | ○ |
| Example 14 | 96 | 40 | 43 | 5B | 5B | 4.2 | ○ | 1.5 | ○ | ○ | ○ |
| Example 15 | 97 | 40 | 43 | 5B | 5B | 4.2 | ○ | 2.8 | ○ | ○ | ○ |
| Example 16 | 96 | 40 | 35 | 5B | 5B | 4.2 | ○ | 3.5 | ○ | ○ | ○ |
| Example 17 | 97 | 50 | 45 | 5B | 5B | 4.2 | ○ | 3.5 | ○ | ○ | ○ |
| Example 18 | 95 | 70 | 50 | 5B | 5B | 4.2 | ○ | 3.5 | ○ | ○ | ○ |
| Example 19 | 94 | 40 | 32 | 5B | 5B | 4.5 | ○ | 3.5 | ○ | ○ | ○ |
| Comparative Example 1 | 85 | 60 | 35 | 4B | 5B | 4.8 | Δ | 5.5 | X | Δ | X |
| Comparative Example 2 | 85 | 80 | 40 | 4B | 5B | 5.2 | X | 7 | X | Δ | X |
| Comparative Example 3 | 92 | 60 | 48 | 4B | 4B | 4.6 | X | 6 | ○ | X | Δ |
| Comparative Example 4 | 89 | 40 | 55 | 4B | 5B | 4.9 | X | 8 | X | X | X |
| Comparative Example 5 | 85 | 40 | 45 | 3B | 5B | 5.1 | X | 12 | ○ | Δ | X |
| Comparative Example 6 | 85 | 40 | 42 | 4B | 5B | 5.1 | X | 6.5 | Δ | X | X |

Referring to Table 2 above, it could be seen that the film touch sensors of the examples had excellent crack prevention effects and excellent sensitivity, adhesion of bridge pattern, transmittance, heat resistance, and solvent resistance of the insulation layer, but the film touch sensors of the comparative examples exhibited that one or more effects are deteriorated.

What is claimed is:

1. A film touch sensor comprising:
   a separation layer;
   a protective layer disposed on the separation layer; and
   an electrode pattern layer disposed on the protective layer,
      the electrode pattern layer including an insulation layer that is a cured layer of a binder resin, the binder resin including a first resin being a resin in which at least a part of a phenolic hydroxyl group or a carboxyl group is protected with an acid decomposable group, a second resin having a second repeating unit derived from acrylic ester containing an epoxy group, and a third resin having a third repeating unit derived from acrylic ester containing an oxetane group.

2. The film touch sensor according to claim 1, wherein the third resin includes a repeating unit represented by Formula 7 below:

[Formula 7]

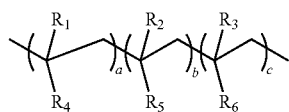

wherein $R_1$, $R_2$ and $R_3$ are each independently hydrogen or a methyl group;

$R_4$ is a structure derived from a monomer selected from a group consisting of Formulae 1 to 3 below:

[Formula 1]

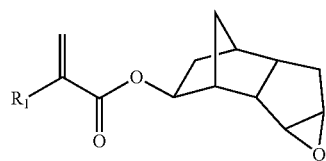

[Formula 2]

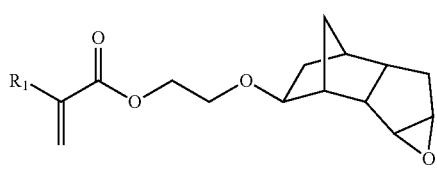

[Formula 3]

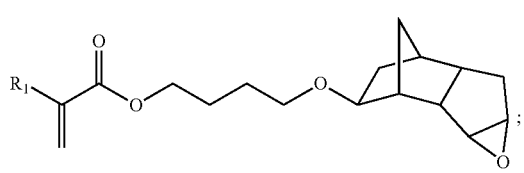

$R_5$ is a structure derived from a monomer selected from a group consisting of (meth)acrylic acid, 2-(meth)acryloyloxyethyl succinate, 2-(meth)acryloyloxyethyl hexahydrophthalate and 2-(meth)acryloyloxyethyl phthalate; and $R_6$ is a structure derived from a monomer represented by Formula 4 below;

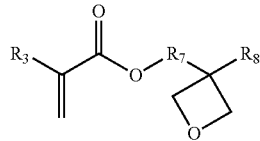

[Formula 4]

where $R_7$ is an alkylene group having 1 to 6 carbon atoms;
$R_8$ is an alkyl group having 1 to 6 carbon atoms; and
a=40 to 80 mol %, b=5 to 45 mol %, and c=10 to 55 mol %.

3. The film touch sensor according to claim 1, wherein the third resin has a weight average molecular weight of 5,000 to 30,000.

4. The film touch sensor according to claim 1, wherein the binder resin includes: 30 to 55 parts by weight of the first resin, 30 to 60 parts by weight of the second resin, and 1 to 25 parts by weight of the third resin to 100 parts by weight of the entire binder resin.

5. The film touch sensor according to claim 1, wherein the electrode pattern layer includes:
   sensing electrodes including first patterns formed in a first direction and second patterns formed in a second direction;
   bridge electrodes configured to connect unit patterns of the second patterns with each other, which are separated from each other; and
   the insulation layer disposed between the sensing patterns and the bridge electrodes.

6. The film touch sensor according to claim 1, wherein the insulation layer has an elastic modulus of 2.8 to 4.5 GPa.

7. The film touch sensor according to claim 1, wherein the insulation layer has a transmittance of 90% or more.

8. The film touch sensor according to claim 1, further comprising a base film attached to an upper side of the electrode pattern layer.

9. A method for fabricating a film touch sensor, the method comprising:
   forming a separation layer on a carrier substrate;
   forming a protective layer on the separation layer;
   forming an electrode pattern layer on the protective layer; and
   peeling-off the separation layer from the carrier substrate,
   wherein the step of forming the electrode pattern layer comprises applying and curing an insulation layer forming composition which contains a binder resin including a first resin being a resin in which at least a part of a phenolic hydroxyl group or a carboxyl group is protected with an acid decomposable group, a second resin being an acrylic resin containing an epoxy group, and a third resin being an acrylic resin containing an oxetane group.

10. The method for fabricating a film touch sensor according to claim 9, wherein the curing of the insulation layer forming composition is performed including pre-bake, exposure, development and post-bake.

11. The method for fabricating a film touch sensor according to claim 10, wherein the pre-bake is performed at 80° C. to 140° C. for 20 seconds to 1,000 seconds.

* * * * *